Jan. 7, 1958
W. B. CART ET AL
2,819,418
DYNAMOELECTRIC MACHINE HAVING ROTOR
MATERIAL REPLACEMENT DEVICE
Filed April 16, 1956
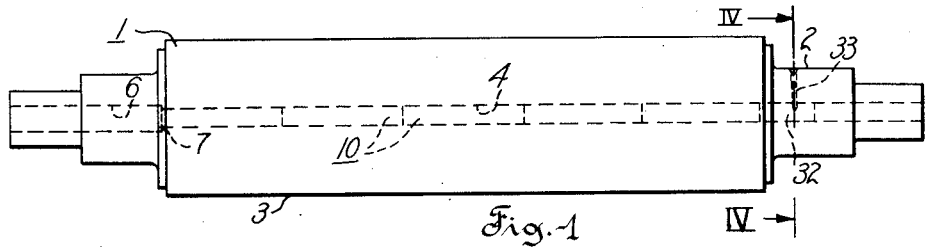
Fig. 1
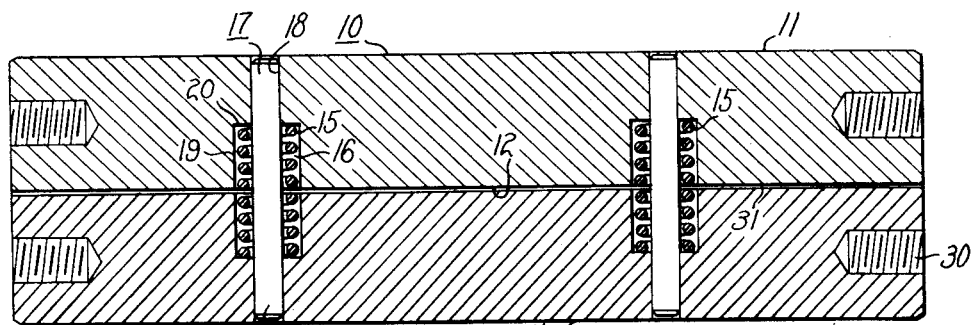
Fig. 2
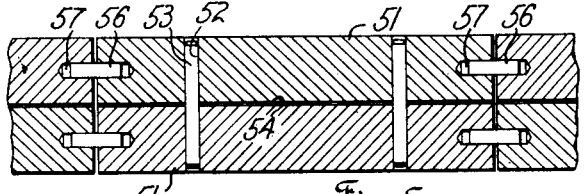
Fig. 5
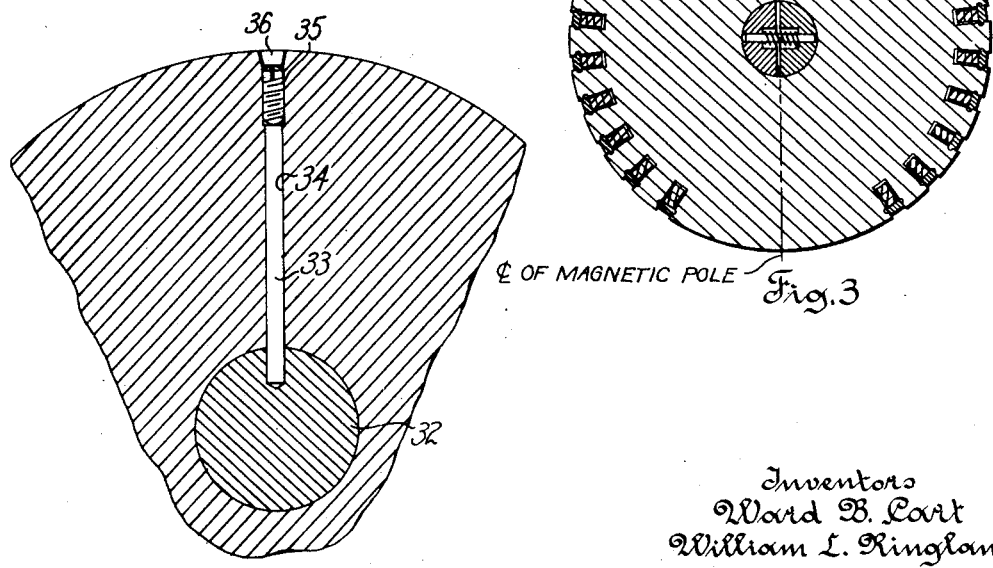
Fig. 4
Fig. 3
Inventors
Ward B. Cart
William L. Ringland
by H. Edward Foerch, Jr.
Attorney United States Patent Office 2,819,418
Patented Jan. 7, 1958

2,819,418

DYNAMOELECTRIC MACHINE HAVING ROTOR MATERIAL REPLACEMENT DEVICE

Ward B. Cart, West Milwaukee, and William L. Ringland, West Allis, Wis., assignors to Allis-Chalmers Manufacturing Company, Milwaukee, Wis.

Application April 16, 1956, Serial No. 578,501

7 Claims. (Cl. 310—261)

This invention relates in general to a dynamoelectric machine including a rotor having an inspection bore in combination with a device replacing magnetic material to the inspection bore.

More particularly this invention relates to a dynamoelectric machine including a rotor having an inspection bore in combination with a device replacing magnetic material to the inspection bore which will expand with expansion of the inspection bore due to centrifugal force stress with the rotor at operating speed.

The rotor core and shaft for large dynamoelectric machines are generally integrally constructed as a large forging. As the rotor of two pole dynamoelectric machines rotates at 3600 R. P. M., it is important that forgings which are used for forming rotors for such machines be free from harmful defects, such as sand holes or internal cracks. Such defects, if permitted to exist, would likely cause failure of the forging when the rotor is rotating at operating speed.

One of the means for inspecting the interior of large forgings used for forming rotors of dynamoelectric machines for harmful defects is to bore through the forging coaxially with the axis thereof. The surface of this bore is then inspected for evidence of sand holes and other defects. Minor defects may then be removed by further boring.

The diameter of these inspection bores varies depending upon the size of the forging and whether defects are found requiring further boring. After the surface of the bore has been inspected and any defects have been removed by further boring, it is often necessary to replace the magnetic core material which was removed by making the bore.

Prior to the present invention one piece solid plugs were often positioned in the bore to replace magnetic core material removed by boring the inspection bore. However, solid plugs have disavantages when used to replace this core material.

One disadvantage of solid plugs arises because the inspection bore in a rotor forging expands as the rotor rotates. This expansion of the inspection bore is caused by centrifugal force stress within the rotor forging when the rotor is rotating during operation of the machine. It is generally well known, for example, that a four inch inspection bore will increase in diameter from eight to ten thousandths of an inch with the rotor at operating speed, or that a six inch bore will increase in diameter from ten to twelve thousandths of an inch with the rotor at operating speed. As the solid plug does not contain centrifugal force stress to the same degree as the rotor forging, it does not expand to the same extent that the bore expands. When the solid plug is snugly positioned in the bore at standstill, a loose fit or air gap occurs between the plug and surface of the bore with the rotor at operating speed. Such an air gap is undesirable because of the interference it causes with the magnetic flux of the rotor.

To overcome this difference in the diametrical expansions which causes an air gap when solid plugs are snugly positioned in a bore, solid plugs have sometimes been installed with a shrink fit. However, shrink fitting a solid plug requires considerable skill to obtain a proper fit. In addition, once the solid plugs have been installed with a substantial interference fit they can be removed only by reboring. If it is desired to reinspect the rotor forging at a later date by inspection of a surface of a bore, it is then necessary to rebore the shaft.

The above disadvantages of prior devices for replacing magnetic core material to an inspection bore in a rotor are effectively overcome by the present invention. According to the present invention the device for replacing magnetic core material in the inspection bore of a rotor comprises two substantially semicyclindrical members of magnetic material. Recess means are provided in the members which define a shoulder and a guide receiving portion. The guide receiving portions have axes which extend radially of the members and normal to the planar surface of the semicylindrical members. When the members are positioned in cylinder forming relation in the bore of the rotor the guide receiving portions are in registering relation. Guide means slidably extend into the guide receiving portion of both members and thereby limit relative movement of the members other than movement parallel to the axis of the guide receiving portion of normal to the planar surfaces of the members. Resilient means are positioned in the recess and react against the shoulders of both members when the members are in cyilnder forming relation and positioned in the bore of the rotor. The resilient means hold the cylindrical surface of the device against the surface of the inspection bore at rotor standstill, and centrifugal force firmly holds the members in contact with the surface of the bore when the rotor is at operating speed.

With the present invention as the machine is brought up to operating speed, the semicylindrical members move apart and follow any expansion of the inspection bore. The only air gap will be located between the planar surfaces of the members. The planar surfaces are preferably positioned substantially parallel to the center line of magnetic pole of the rotor to create the minimum interference with the rotor magnetic flux. Also, the present device is easily positioned in the inspection bore with a snug fit and it is easily removable therefrom.

It is therefore an object of this invention to provide a dynamoelectric machine in combination with an improved device replacing magnetic material in an inspection bore in the rotor of the dynamoelectric machine.

Another object of this invention is to provide a dynamoelectric machine in combination with an improved device of magnetic material which is easily installable to provide a snug fit in an inspection bore in the rotor of the dynamoelectric machine.

Another object of this invention is to provide a dynamoelectric machine in combination with an improved device of magnetic material which when positioned in an inspection bore of a rotor of a dynamoelectric machine will expand to take up for expansion of the diameter of the inspection bore due to centrifugal force stress with the rotor at operating speed.

Another object of this invention is to provide a dynamoelectric machine in combination with an improved device replacing magnetic material to an inspection bore of a rotor of a dynamoelectric machine and which is easily removable from the bore.

Other objects and advantages will be apparent from a consideration of the following description taken in connection with the accompanying drawing having views drawn to different scales in which:

Fig. 1 is a longitudinal view of the rotor forging for a dynamoelectric machine in combination with devices positioned in an axial inspection bore in accordance with this invention;

Fig. 2 is a longitudinal sectional view of the device shown in Fig. 1;

Fig. 3 is a cross sectional view of the rotor forging illustrating the position of the device relative to the magnetic pole;

Fig. 4 is a partial sectional view along lines IV—IV of Fig. 1; and

Fig. 5 is a modification of device shown in Fig. 2.

Referring to the drawing, a rotor forging 1 for a dynamoelectric machine is illustrated comprising a shaft 2 and a core portion 3 integrally constructed. An inspection bore 4 is shown extending through the rotor forging 1 and coaxially therewith. Rotor slots 5 are provided in the core portion 3 with rotor windings positioned therein. At one end of the inspection bore 4 is an enlarged portion 6. Conductor leads (not shown) are led through this enlarged portion 6 and connect to the rotor windings. The conductor leads abut against surface 7 at the inner end of the enlarged portion 6 with suitable insulation therebetween thereby closing one end of the inspection bore 4.

While a single device extending the length of the rotor core may be positioned in the inspection bore to replace the magnetic material removed by boring, it is preferred to use several of the devices of shorter length, the sum of which is at least equal the length of the rotor core. Accordingly, several devices 10 are shown in Fig. 1 positioned in abutting relation in the inspection bore 4. By using a series of short devices the spiralling effect which results because of the length of the bore is compensated for, and the cylindrical surfaces of the several devices more nearly conforms to the shape of the inspection bore 4.

The device 10 includes two substantially semicylindrical members 11, as shown in Fig. 2. The members 11 are constructed of magnetic material of the desired length. Members 11 are in cylinder forming relation when they are positioned in the inspection bore 4.

Means are provided exerting a force radially outward of the members 11 in a direction normal to the planar surface 12 of the members. These means may comprise resilient means 15, recess 16 and guide means 17. Any number of such means exerting a force radially outward of the members may be provided for the device, and two such means are shown in Fig. 2.

Although recess 16 may be of any convenient shape, it is preferably formed by a guide receiving portion or bore 18 and a resilient means containing portion or counter bore 19 of a desired diameter to provide a shoulder 20. The axis of recess 16 extends radially of the members 11 and normal to the planar surface 12, and shoulder 20 is parallel to the planar surface 12 of the members 11. When the members are in cylinder forming relation, recesses 16 of the two members are in registering relation and shoulders 20 of the two members 11 are in opposing relation.

Guide means 17 are provided to assure that relative movement of members 11 is normal to the planar surface of the members and to aid in positioning the device in the bore. These guide means may comprise guide pin 26 which slidably engages guide receiving portion 18 of recess 16 of both members and thereby limits relative lateral movement of the members 11 other than movement normal to the planar surfaces 25 of the members. The length of guide pin 26 is less than the diameter of the device so that the pins will not interfere with positioning the device in the inspection bore.

The resilient means are shown comprising helical spring 15, although other resilient means or forms of springs may be used. The ends of spring 15 react against the shoulders 20 of recesses 16 to exert a force radially of the members along the axis of recess when they are compressed.

Because spring 15 is positioned within the recess 16, it does not interfere with positioning of the members in cylinder forming relation within the inspection bore 4. Spring 15 is compressed when the device is positioned in the axial bore sufficiently so that the spring 15 has enough resilience to support the weight of at least one element. The spring 15 will then hold the device in the selected position against the surface of the bore and restrain rotation thereof while the rotor is at standstill and velocity changes.

When energized, the windings in core slots 5 will provide magnetic poles having a center line, as shown in Fig. 3. As an air gap 31 occurs between the planar surfaces 12 of members 11 when the members are in position in the inspection bore, the device 10 is preferably positioned in the bore 4 so that the air gap is parallel to the center line of the magnetic poles. In this arrangement the air gap causes negligible interference with the magnetic flux of the rotor.

As the rotor winding conductor leads enter the enlarged end of the rotor bore and close that end of the rotor bore, the several devices 10 are positioned in the bore through the other end.

In order to position the device in the axial bore and to remove it again when it is so desired, tap 30 is provided in the end of each member 11. Suitable means such as a threaded rod may be used to engage the tap 30 for positioning and removing the members 11 from the bore 4.

After devices 10 are positioned in the inspection bore for the full length of the rotor core, the other end of the bore is closed by suitable means. These means may comprise a solid plug 32 and rod 33 which locks the solid plug against the end of the last device in the bore.

Because the solid plug 32 is positioned in the bore at the point beyond the rotor core, it is not necessary to protect against an air gap forming between the surface of the solid plug and the surface of the bore with the rotor at operating speed. Thus, plug 32 is snugly positioned in the bore abutting the last device 10.

Solid plug 32 is locked in bore 4 by a rod 33 which is positioned in a bore 34 extending radially from the outer periphery of the rotor shaft to the axial bore 4 and partially through solid plug 32. Rod 33 is held in bore 34 against centrifugal forces by plug 35 and locking plug 36 threaded in bore 34. This arrangement of closing the other end of the axial bore 4 permits removal of the solid plug 32 and the devices 10 when a reinspection of the plug through examination of the surface of the axial bore is desired.

Members 11 may be formed from either separate pieces of magnetic material or from a cylindrical piece of bar stock cut along a diameter. The outer cylindrical surface is finished to the desired diameter with a small air gap distance separating the planar surfaces of the members. This small air gap assures easy positioning of the device in the inspection bore and removal therefrom. Thus, in turning the outer surface of the members to the desired diameter it has been found convenient to position a shim between the planar surfaces of members 11 and weld a temporary centering lug on each end of the device. After the surface of the device has been machined to the desired diameter, the bore for receiving portion 18 may be made and the temporary centering lug and shim removed.

During operation, the inspection bore of the rotor will expand due to centrifugal force stress within the rotor at operating speed. As the members of the device are free to move normal to their planar surfaces, centrifugal forces will aid the resilient means to cause the device to follow the expansion of the inspection bore and the surfaces of the members will remain in contact with the surface of the inspection bore. Additionally, the device may be removed if it is desired to reinspect the surface of the inspection bore at a later date for defects in the rotor forging.

In an alternate embodiment shown in Fig. 5, the device comprises semicylindrical members 51 having guide receiving portions 52 receiving guide means or pins 53 extending normal to the planar surfaces 54. Members 51 are held from substantial rotation in the inspection bore 4 at rotor standstill and velocity changes by dowels 56 loosely fitted into holes 57 in the abutting ends of members 51. Each adjacent member 51 is restrained from rotation by this interlocking with the adjacent device and by the end member being restrained from rotation by the solid plug 32.

During operation of the machine, rotation of the rotor causes the semicylindrical members 51 to move apart guided by pins 53 and the members remain in contact with the surface of the inspection bore.

Although only two embodiments of the invention have been shown and described, changes and modifications may be made therein without departing from the spirit of the invention or from the scope of the appended claims.

It is claimed and desired to secure by Letters Patent:

1. A dynomoelectric machine comprising a rotor having an axial inspection bore, core replacement means positioned in said inspection bore, said means including two substantially semicylindrical members of magnetic material arranged in cylinder forming relation, means substantially limiting relative movement of said members other than movement normal to the planar surfaces of said members, and means limiting rotation of said core replacement means within said bore at rotor standstill and velocity changes.

2. A dynamoelectric machine comprising a rotor having an axial inspection bore, core replacement means positioned in said inspection bore, said means including members of magnetic material arranged in cylinder forming relation, means substantially limiting relative movement of said members other than movement radially of said means, and means limiting rotation of said core replacement means within said bore at rotor standstill and velocity changes.

3. A dynamoelectric machine comprising in combination with a rotor having an axial inspection bore, a device positioned in said inspection bore, said device including two substantially semicylindrical members of magnetic material arranged in cylinder forming relation, each of said members having a recess defining a shoulder, and resilient means positioned in said recesses of said members exerting a force against said shoulder of both said members to cause the cylindrical surface of said device to engage the surface of said bore.

4. A dynamoelectric machine comprising in combination with a rotor having an axial inspection bore, a device positioned in said inspection bore, said device including members of magnetic material arranged in cylinder forming relation, each of said members having a recess defining a shoulder and a guide receiving portion having an axis radially of said device, a guide means slidingly engaging said guide receiving portion of said recesses, and resilient means positioned in said recesses of said members exerting a force against said shoulders to cause the cylindrical surface of said device to engage the surface of said bore.

5. A dynamoelectric machine comprising in combination with a rotor having an axial inspection bore, a device for replacing magnetic material to said inspection bore including a pair of substantially semicylindrical members of magnetic material positioned in said bore in cylinder forming relation, each of said members having a recess defining a guide portion having a radial axis normal to the planar surface of said member and defining a shoulder, a guide means slidingly engaging said receiving portion of both of said members, and resilient means positioned in said recesses of said members exerting a force against said shoulder to cause the cylindrical surface of said device to engage the surface of said bore.

6. A dynamoelectric machine comprising a rotor having slots containing windings causing magnetic poles on said rotor when said windings are energized with the center line of said magnetic poles extending through the center of said rotor, an inspection bore extending coaxially through said rotor, a pair of substantially semicylindrical members of magnetic material positioned in said bore in cylinder forming relation with the planar surfaces of said members substantially parallel to the center line of said magnetic poles, each of said members having a recess defining a guide receiving portion having a radial axis normal to the planar surface of said member and defining a shoulder substantially parallel to said planar surface, a guide means slidingly engaging said guide receiving portion of both of said members, and resilient means positioned in said recesses of said members exerting a force against said shoulders to cause the cylindrical surface of said device to engage the surface of said bore.

7. A dynamoelectric machine comprising a rotor having slots containing windings causing magnetic poles on said rotor when said windings are energized with the center line of said magnetic poles extending through the center of said rotor, an inspection bore extending coaxially through said rotor, two substantially semicylindrical members of magnetic material positioned in said bore in cylinder forming relation with the planar surfaces of said members substantially parallel to the center line of said magnetic poles, each of said members having recesses each defining a guide receiving portion having a radial axis normal to the planar surface of said member and defining a shoulder parallel to said planar surface, guide means slidingly engaging said guide receiving portions of said recesses of both of said members, and resilient means positioned in said recesses of said members exerting forces against opposing said shoulders to cause the cylindrical surface of said device to engage the surface of said bore.

No references cited.